United States Patent [19]

von der Becke et al.

[11] Patent Number: 4,627,417
[45] Date of Patent: Dec. 9, 1986

[54] STEAM PRESSURE COOKER

[76] Inventors: Reinhard von der Becke, Obere Rebhalde 21, CH-6340 Baar, Switzerland; Horst Schultz, Bergmannweg 2, D-6230 Frankfurt am Main 80, Fed. Rep. of Germany

[21] Appl. No.: 642,373

[22] Filed: Aug. 20, 1984

[30] Foreign Application Priority Data

Aug. 25, 1983 [CH] Switzerland ............... 4699/83

[51] Int. Cl.$^4$ .............................................. F24D 1/00
[52] U.S. Cl. .................................... 126/369; 220/323; 126/378
[58] Field of Search ............... 126/369, 378, 376, 389, 126/348; 220/247, 256, 318, 314, 323; 99/403; 219/431, 440, 494

[56] References Cited

U.S. PATENT DOCUMENTS

| 654,044 | 7/1900 | Alexander | 220/323 |
|---|---|---|---|
| 2,793,787 | 5/1957 | Lescure | 220/323 X |
| 4,238,996 | 12/1980 | Okuyama | 126/369 X |
| 4,387,740 | 6/1983 | Vanzant | 220/323 X |

FOREIGN PATENT DOCUMENTS

1408944 7/1965 France .......................... 220/323

Primary Examiner—Randall L. Green
Attorney, Agent, or Firm—Breneman, Georges Hellwege & Yee

[57] ABSTRACT

The invention relates to a steam pressure cooker, which essentially consists of a lower pot and a cover unit sealing the lower pot. The lower pot has a smooth circular pot rim. The cover unit consists of a lower lid and an upper lid. The latter is designed as a sealing element, which engages the lower part of the pot rim by the flanges. As an improvement of this type of pressure cooker, it is proposed that the upper lid contain two half-lids, and that each half-lid be able to rotate about its own axis of rotation essentially parallel to the central axis of the pot (geometrically vertical) relative to the lower lid and lower pot, and further, that the axes of rotation lie eccentric to the pot's central axis and diametrically opposite each other with respect to this axis swivel mechanism rotatably supported concentrically on the lower lid.

35 Claims, 7 Drawing Figures

STEAM PRESSURE COOKER

BACKGROUND OF THE INVENTION

1. Field of the Invention

The invention concerns a steam pressure cooker, which consists of a lower pot and a cover unit for pressure sealing the lower pot by means of a ring-shaped sealing element in which said lower pot has a circular, smooth pot rim angled toward the outside which pot rim from a top plan view preferably has a continuous circular outer edge and said cover unit has a lower lid and at least one sealing element forming the upper lid which seals in the closed position that is movable relative to the lower lid and said lower pot on a plane parallel to the plane of the pot rim and also has an upper rim section of the upper lid for engaging an outer rim portion of the lower lid and at least one lower flange of the upper lid extending across about half the perimeter and engaging the lower portion of the pot rim in the locking position.

2. Description of the Prior Art

A similar pressure cooker is shown in German patent 25 34 709 which consists of a lower lid and a seal ring, which is designed as a second closed lid and is supplied with a flange engaging the lower part of the pot rim along about half the perimeter. The result is that when the lid and the seal ring are rotated in opposite directions to each other, the flanges can be placed in an overlapping position. In this position the lid together with the seal ring can be removed laterally from the pot rim. In this case a pushing action must be exerted to put on and remove the cover unit. To open and close the pressure cooker it is further necessary to rotate the whole seal ring forming the second closed lid relative to the lower lid.

The purpose of the present invention is to redesign this type of prior art pressure cooker to make it simple in construction, reliable to use and easier to handle.

These improvements are provided by the present invention by the following construction. An upper lid consists of two half-lids; each half-lid rotates relative to the lower lid and the lower pot about their own swivel axis which is essentially parallel to the central vertical axis of the pot. These swivel axes lie eccentrically to the central axis of the pot and diametrically opposite each other in a swivel mechanism hinged in the middle of the lower lid.

SUMMARY OF THE INVENTION

In accordance with the present invention opening and closing of the cover unit relative to the lower pot is accomplished simply by rotating the swivel mechanism. During the process of opening, both half-lids perform a semi-circular motion corresponding to their eccentric bearing at the swivel mechanism; the half-lids move vertical and roughly parallel to their separation line until the flanges no longer engage under the pot rim. The cover unit can then easily be lifted upward. To close the pot, one also simply sets the cover unit down onto the lower pot vertically from above. By rotating the swivel mechanism in the opposite direction the two half-lids move in a semi-circular direction, until they match up again into a complete cover unit through an overlapping or interengaging action. At the same time the flanges virtually encircle the perimeter of the pot rim and engage under it. The motion defined by both half-lids is determined essentially by the eccentric position of the swivel axes on the central axis of the pot. For example, by rotating the swivel mechanism 180 degrees, the swivel axes exchange their positions. The swivel axis of each half-lid is situated on one side of the central axis of the pot in the closed position, and on the other side in the open position. Therefore, the two half-lids move away from each other during a rotation of the swivel mechanism by 180 degrees, while the lower flanges release the pot rim. The eccentric suspension of the swivel axes also means that a rotation of the swivel mechanism by less than 180 degrees is sufficient. For example, a rotation of approximately 90 degrees is sufficient.

Activating the locking mechanism is extremely simple and easy. There are only a few simple parts required to construct the steam pressure cooker according to the invention. The pressure cooker looks like a normal cooking pot in the closed position of the half-lids. The technical parts of the activating mechanisms that are "frightening" to a housewife are not visible. Like a normal lid the cover unit is placed on the lower pot from above and is similarly removed. To lock the unit, the housewife merely has to rotate the swivel mechanism up to 180 degrees.

The pressure cooker shown in German patent 896 409 is known to have the following characteristics: the joining between the lid and the lower pot is performed by radially shiftable grapnels which engage under the lid rim and the pot rim. The radial motion of the grapnels is accomplished by a round-key disc rotatably supported on the container lid and having numerous curved guides into which engagement pins connect with the free-lying grapnels. The system, however, has the disadvantage that the pot rim will be engaged under only a relatively small part of its circumference. To obtain a tight seal with an adequate clamping effect, the material composing the pot rim, lid rim and grapnels must be of a fairly massive construction. Additionally, the usual rough handling can lead to a serious impairment of this sealing system by interfering with the precise positioning of the grapnels into the guides. A further disadvantage is the "technical appearance" of this known pressure cooker.

As mentioned above, the two half-lids in the present invention interlock partially. Also of special advantage is in the feature that both half-lids are essentially identical and form a complete upper lid upon interengaging each other in the closed position. The closed cover unit thereby receives a thoroughly smooth surface.

The swivel axes can be either hinged to rotate in the swivel mechanism as special components or can be designed integrally as part of the swivel mechanism.

In a further embodiment of the invention, the interengaging edges of the half-lids at first run radially from their outer perimeter in axial symmetry with regard to the eccentric position of their respective swivel axes; then, at about the height of the swivel axes, the rims encircle first concave indentations, and then convex tongues associated with the swivel axis, and finally, the edges run once again radially in diametrically opposed sides of the outer perimeter. With this construction the shifting of the identical half-lids can be accomplished in an easy manner by simple rotation of the swivel mechanism with identical half lids.

In order to create a completed upper lid in the closed position, the indentations and tongues form an interengaging connection of the half lids.

In another preferred embodiment of the invention the swivel mechanism has two circular washer sections placed eccentrically to the central axis of the pot. The mid-points of these washer sections correspond with the positions of the central axis of the swivel axes in which each circular washer section is pivotally disposed in a corresponding round recess in their respective half-lids.

Preferably the geometrical central axes of the swivel axes lie on the same vertical plane of symmetry both in the fully closed position and in the fully open position of the half-lids. For opening or closing, the swivel mechanism is rotated exactly through 180 degrees in a direction as can be indicated by appropriate markings.

A further feature concerning the invention is that the lower flanges of the half-lids gradually taper in width radially towards the interengaging edges of the half-lids with the taper proceeding from the plane of symmetry containing the geometrical central axis of the swivel axes. In this system a relatively minor rotational action is sufficient to move the lower flanges into or out of engagement with the pot rim.

This advantage can be further augmented by the fact that the profile of the inner edges of the lower flanges of the half-lids correspond to the contour of the corresponding area of the outer edge of the pot rim.

In the case of an outwardly circular pot rim, it is also useful when the inner edges of the lower flanges of the half-lids conform to a circle having a radius corresponding to the radius of the circle formed by the outer edge of the pot rim. In the closed position, the flanges engage the lower part of the pot rim in a sickle-shaped manner up to nearly 360 degrees. In the open position, the inner edges of the flanges lie somewhat outside the outer edges of the pot rim so that the cover unit can be pulled upward.

A functionally reliable sealing mechanism simple in construction is further created when the swivel mechanism rotatably projects with little play through a central opening of the lower lid by means of a screw threading and is rotatably held at the lower lid by means of a counter-nut which is screwed onto the screw threading.

In order to ensure ease of rotation, the screw threading and/or the lid opening can have circular cross-sections. A useful feature is that the swivel mechanism projects upward with the screw threading from the inner side of the lower lid.

A reliable functioning of the sealing mechanism can further be assured when the swivel mechanism is supported on the upper face of the lower lid by a widened collar situated between the lower lid and the half-lids. The height of the collar preferably corresponds to the width of the gap between the lower lid and the half-lids. By these means, the half-lids are guided onto the collar during their outward and inward motion. Preferably the half-lids are supported by the middle section of the flat upper face of the collar.

To simplify the operation, the swivel mechanism preferably is securely connected to a lid grip disposed above the half-lids. This lid-grip serves not only to operate the sealing mechanism, but also eases the handling of the cover unit, thereby making a special lid grip unnecessary.

In a further preferred embodiment of the invention a guide piece is positioned between the lower lid and the half-lids having two axial-symmetrically placed guide grooves. The half-lids engage these guide grooves by means of a guide pin. This system ensures that the half-lids do not move in random way while being opened or closed.

Further, it is preferred that the guide grooves be parallel to each other in the closed position and to the plane of symmetry. The geometrical central axes of the swivel axes lie on this plane of symmetry and the guide piece rotates around the central axis of the pot. By this means the two half-lids can only undergo the rotational motion established by their eccentric position.

Another advantage can be obtained if the guide piece surrounds the swivel mechanism in a ring-like manner and thereby has a secure seat.

The height of the guide piece can correspond essentially to the width of the gap between the lower lid and the half-lids. This allows for the half-lids to be guided onto the guide piece.

A simplifying measure of the invention is that the swivel axes are designed as pins received in bore-holes of the swivel mechanism.

Another optional feature of the invention is that at least one of the two swivel axes is designed as a channel axis providing a flow connection between the interior of the pot and a manometer and/or a thermometer provided in the lid grip. The lid grip is equipped with a recess for housing the manometer and/or thermometer.

In order to further simplify the centering of the cover unit onto the lower pot, the lower lid may be designed as a frame lid and have a circumferential groove in the area of the lid seat for accepting a gasket ring. Preferably the lower pot has a circumferential groove in the transition zone between the wall and the flanged pot rim. This serves as a catch for the gasket ring in the circumferential groove of the lower lid. This circumferential groove also serves as a condensation groove.

In a special embodiment of the invention in order to avoid any possibility of the pressure cooker from being open when there is too much pressure in the pot, an air vent and pressure discharge device is provided in the lower lid which includes a vertically-movable valve element which ascends as a result of pressure prevailing in the pot through a safety opening in the corresponding half-lids; the diameter of the safety opening is just larger than the diameter of the valve element. In this way, any movement of a half-lid is blocked under conditions of overpressure in the pot. The opening mechanism can be operated only when the valve element has receded under conditions of a complete drop in pressure and the movement of the half-lids is no longer blocked.

Further purposes, advantages and possibilities for application of the present invention will be evident from the following descriptions of a preferred specific embodiment shown in the attached figures. Thereby the description and drawings will be combined to create a meaningful composite of the invented article, and should be independent of the summary given in the appended claims or of any reference thereto.

DETAILED DESCRIPTION OF THE INVENTION

Figure 1:
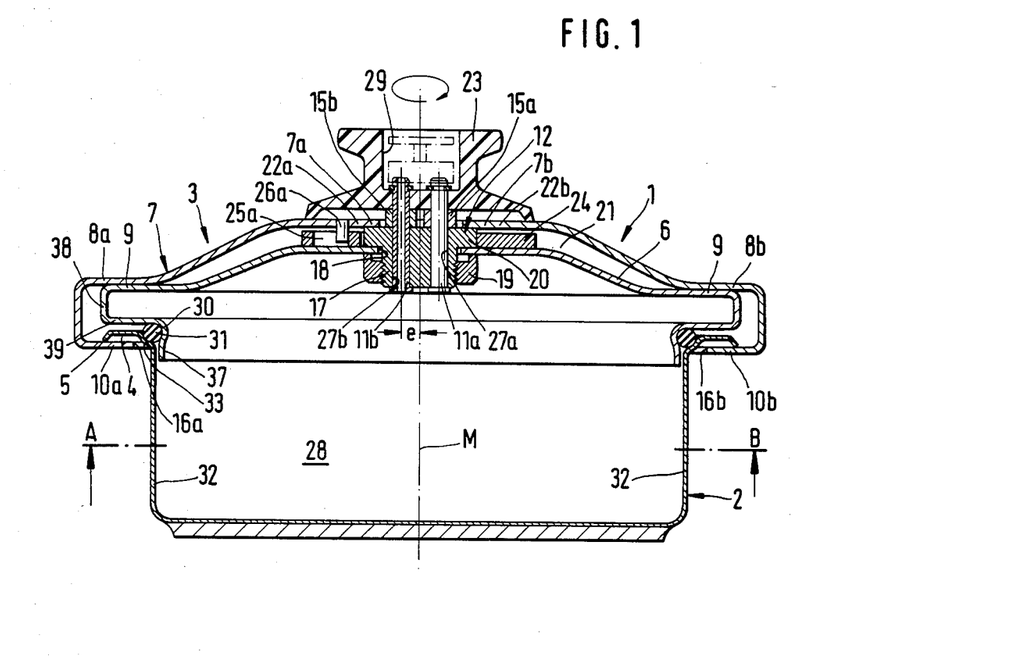
FIG. 1 is a vertical section E-F (in accordance with FIG. 3) through a steam pressure cooker according to the invention, the cover unit of which is shown in a closed position.
Figure 2:
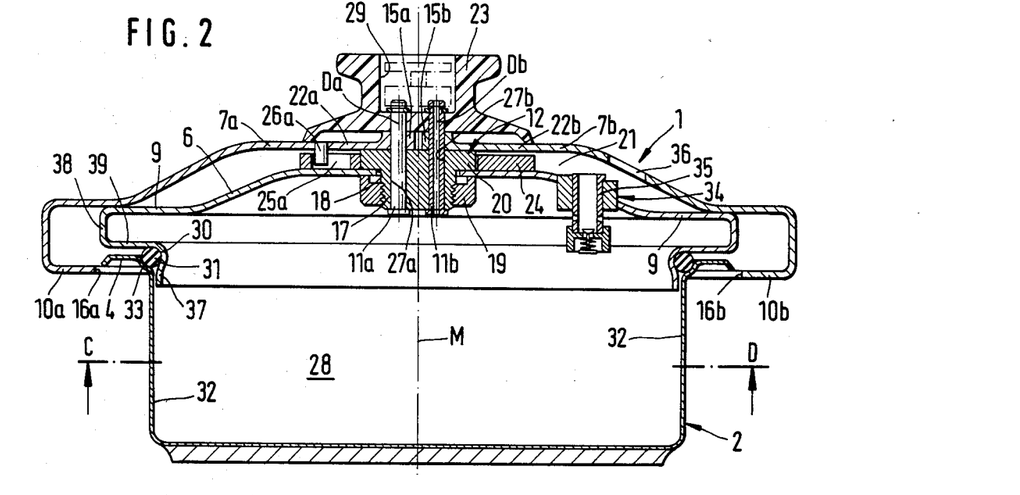
FIG. 2 is a vertical section G-H (in accordance with FIG. 4) through a pressure cooker (in accordance with FIG. 1), the cover unit of which is shown in an open position however, and positioned atop the lower pot.
Figure 3:
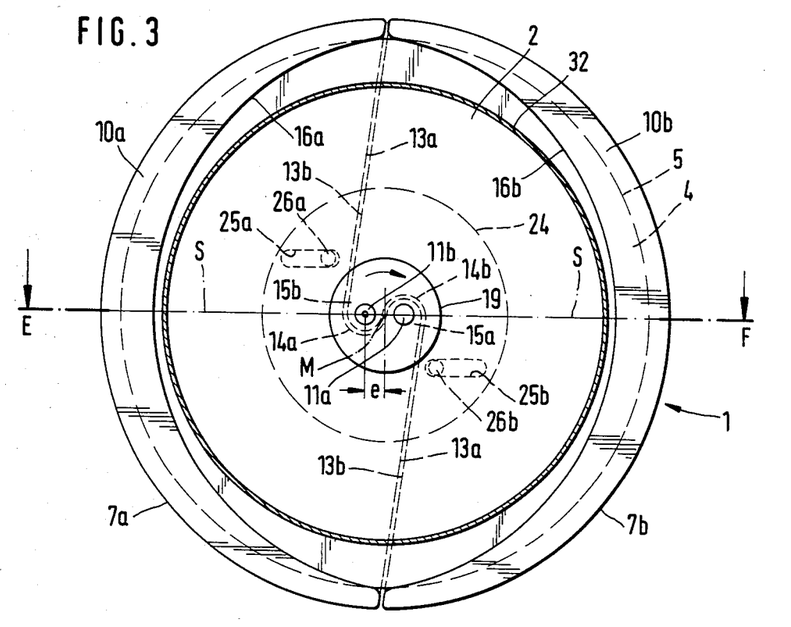
FIG. 3 is a horizontal section A-B (in accordance with FIG. 1) through a pressure cooker (in accordance with FIG. 1), the cover unit of which is shown in the closed position.
Figure 4:
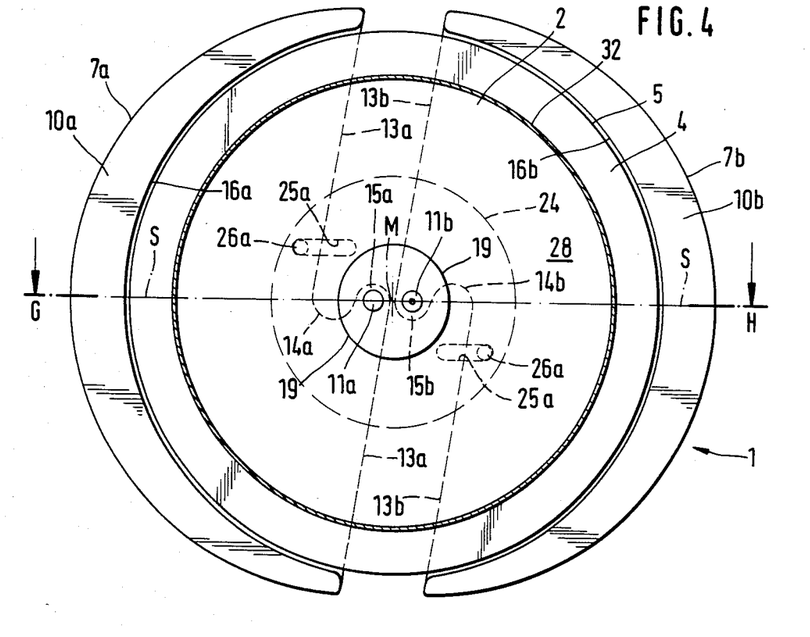
FIG. 4 is a horizontal section C-D (in accordance with FIG. 2) through a pressure cooker (in accordance with FIG. 1), the cover unit of which is shown in an open position, however, and set atop the lower pot.

The steam pressure cooker (1) consists of a lower pot (2) and a cover unit (3). The lower pot (2) has a sloped, circumferential, flat pot rim (4) at the outer end of wall (32). The outer edge (5) of the pot rim (4) is angled somewhat downwards. The circumferential groove (33) encircles the pot interior (28) in the transition zone between the wall (32) and the pot rim (4). A gasket ring (31) of the cover unit (3) fits tightly into this groove (33). The cover unit (3) has an essentially closed lower lid (6) and an upper lid (7) positioned on it. The lower lid (6) has an outer flat rim area (9) adjoining a horizontal, circular flat shank (39) through a vertical, circular shank (38). The horizontal shank (39) overhangs the pot rim (4). At the inner end of the horizontal shank (39), a frame (37), is adjacent to an outer annular circumferential groove (30). The lower lid (6) can be positioned upon the lower pot (2) by means of this frame (37). A specially designed gasket ring (31) fits as an O-ring or cable into the groove (30). The upper lid (7), which is positioned on the lower lid (6), consists of two identical half-lids (7a and 7b). These sit atop the upper side of a flat rim area of the lower lid (6) by means of flat exterior rim sections (8a and 8b). The half-lids (7a and 7b) are shown in FIGS. 1 and 3 in the closed position and in the opened position in FIGS. 2 and 4. The half-lids (7a and 7b) can be shifted into both the closed and open positions. The half-lids (7a and 7b) engage under the pot rim (4) in the closed position with specially constructed, sickle-shaped flanges (10a and 10b). By this means the half-lids (7a and 7b) press the lower lid (6) against the gasket ring (31) so the interior (28) of the pot is sealed pressure-tight. The inner edges (16a and 16b) of the flanges (10a and 10b) run along a circle, the radius of which matches the radius of the circle formed by the outer edge (5) of the pot rim (4). As is clearly visible from FIG. 3, the flanges (10a and 10b) engage under the pot rim (4) practically over its entire perimeter in the closed position. In the open position, the two half-lids (7a and 7b) have moved completely away from each other, as shown in FIGS. 2 and 4. In the open position the two inner edges (16a and 16b) lie directly outside of the outer edge (5) of the lid rim (4). In this way the cover unit (3) can be removed from the lower pot (2). The two half-lids (7a and 7b) can be rotated about their own axes of rotation (11a and 11b) (or "swivel axes"), parallel to the central axis (M) of the pot (geometrically vertical) and can be shifted relative to the lower lid (6) and the lower pot (2). The swivel axes (11a and 11b), designed as pins, are eccentric to the central axis (M) of the pot. These swivel axes (11a and 11b) lie diametrically to each other relative to the central axis of the pot in bore-holes (27a and 27b) in a swivel mechanism hinged in the middle of the lower lid (6). The geometrical central axes ($D_a$ and $D_b$) of the swivel axes (11a and 11b) lie essentially on the same vertical plane of symmetry (S) whether in the fully closed position, or after a rotating the swivel mechanism (12) by 180 degrees to the fully opened position of the half-lids (7a and 7b). This is clearly shown in FIGS. 3 and 4. The swivel mechanism (12) projects down with little play by a screw threading (17) through a lid opening (18) in the lower lid (6). The swivel mechanism (12) is supported on the upper side of the lower lid (6) by means of a collar (20), which is seated in a gap (21) between the lower lid (6) and the upper lid (7). The half-lids (7a and 7b) rest upon the flat upper side of the collar (20) by means of a central part (22a and 22b). Onto the screw threading which projects into the pot interior (28), a counter-nut (19) is screwed on so as to enable the swivel mechanism (12) to be secure at the lower-lid (6) as well as be rotatable. A lid-grip (23) is positioned upon the swivel axes' (11a and 11b) ends, which protrude upward. The lid-grip (23) is thereby rotatable with the swivel mechanism (12) with respect to the lower lid (12). The lid-grip (23) is equipped with a recess (29) for housing a manometer or thermometer. The manometer or thermometer can be in flow connection to the inner space (28) of the pot by means of the swivel axis (11b) which is designed as a channel axis. The half-lids (7a and 7b) have edges (13a and 13b) adjacent to each other. These edges (13a and 13b) run axially symmetrical to each other from one side of their outer perimeter and with respect to the eccentric position (e) of the corresponding swivel axes (11a and 11b). In other words, the rims run radially up to the plane of symmetry (S) up to the height of the swivel axes (11a and 11b). indentation (14a and 14b) and then convex tongues (15a and 15b), which accept the swivel axes (11a and 11b). Finally, they continue on essentially radially to the diametrically opposite side of their outer perimeter. In the area of the tongues (15a and 15b) the material of the half-lids (7a and 7b) is reinforced to a sleeve shape. This is shown in FIGS. 1 and 2. From FIGS. 1 and 2 it can also be observed that the tongues (15a and 15b) lie on the plane of symmetry (S) on the other side of the central axis (M) of the pot. In the open position the tongues (15a and 15b) are situated on the same side as their corresponding half-lids (7a and 7b). By rotating the swivel mechanism (12) by means of the lid-grip (23) the swivel axes (11a and 11b) change their position on the plane of symmetry (S), so that the half-lids (7a and 7b) move out of the closed position from which the lower flanges (10a and 10b) engage under the pot rim (4), and into the open position in which the flanges (10a and 10b) release the pot rim (4). As the swivel mechanism (12) rotates 180 degrees out of the closed and into the open position, the half-lids (7a and 7b) move on a horizontal plane corresponding to the eccentric position of the swivel axes (11a and 11b) from each other. The motion thereby is at first in the direction of the radially-running sections of their adjacent edges (13a and 13b), that is to say, vertical to the plane of symmetry (S), and continue in a lateral motion in accordance with the course of the plane of symmetry (S). It is thereby particularly easy to release the cover unit (3) from the pot rim (4). Exactly the reverse series of motions occurs for closing. So that the two half-lids (7a and 7b) execute a definite movement, a guide piece (24) is set between the lower lid (6) and the upper lid (7). The guide piece (24) surrounds the collar (20) of the swivel mechanism (12) in a ring-like manner and is thereby guided in its rotational motion by the collar (20). The guide piece (24), according to FIGS. 3 and 4, has two guide grooves (25a and 25b) lying symmetrically to each other. The half-lids (7a and 7b) grip into the guide grooves (25a and 25b) with their respective guide pins (26a and 26b). The guide grooves (25a and 25b) run essentially parallel to each other and to the plane of symmetry (6). This guarantees that the approximately radial sections of the edges (13a and 13b) remain essentially parallel to each other during the movement of the half-lids (7a and 7b). So that the pressure cooker (1) cannot be opened when overpressure is present in the interior (28) of the pot an air-vent and pressure discharge device (34) of known type are provided in the lower lid (6) (only shown in FIG. 2). The device (34) has a vertically-movable valve element (35), which allows ventilation during the beginning of the cooking process, then a pressure release valve provided at the lower end of the valve weight (35) closes and the valve weight (35) is raised by the functioning of the built-up pressure (thus pressure-sealing the pot interior (28)). As long as high pressure prevails in the pot interior (28), the upper end of the valve (35) stays up in a safety opening (36) in one of the half-lids (7b). The open position of the pot is observable in FIG. 2. Here the safety opening (36) is not above the valve weight (35), as is the case in the closed position, but is moved radially outward. When the valve weight (35) projects its upper end into the safety opening (36), so as to be clearly visible, the whole opening mechanism is blocked so that the pressure cooker cannot be opened when it is under pressure.

Figure 5A:
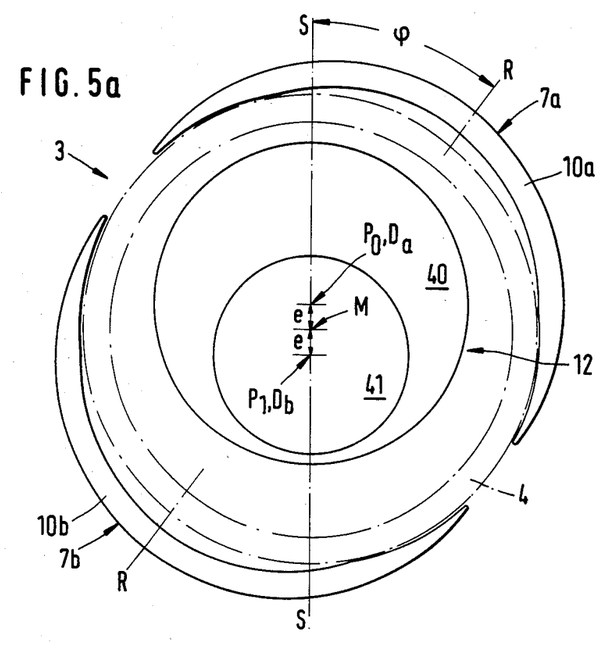
FIGS. 5a to 5c are schematic top views of the cover unit showing the method of functioning of another embodiment of the invention.
Figure 5B:
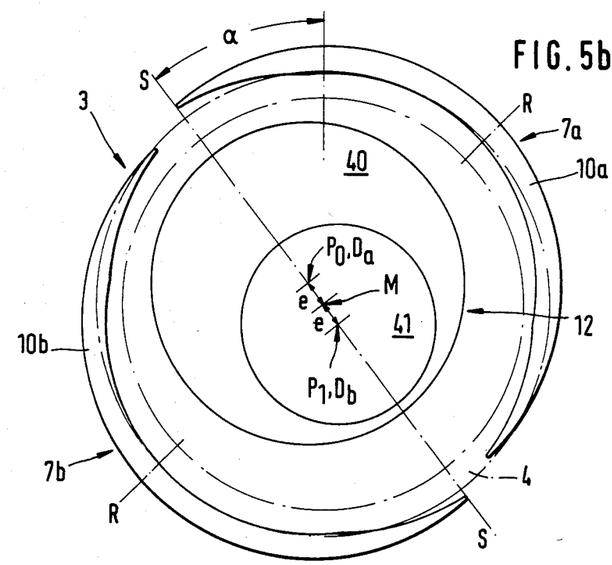
Figure 5C:
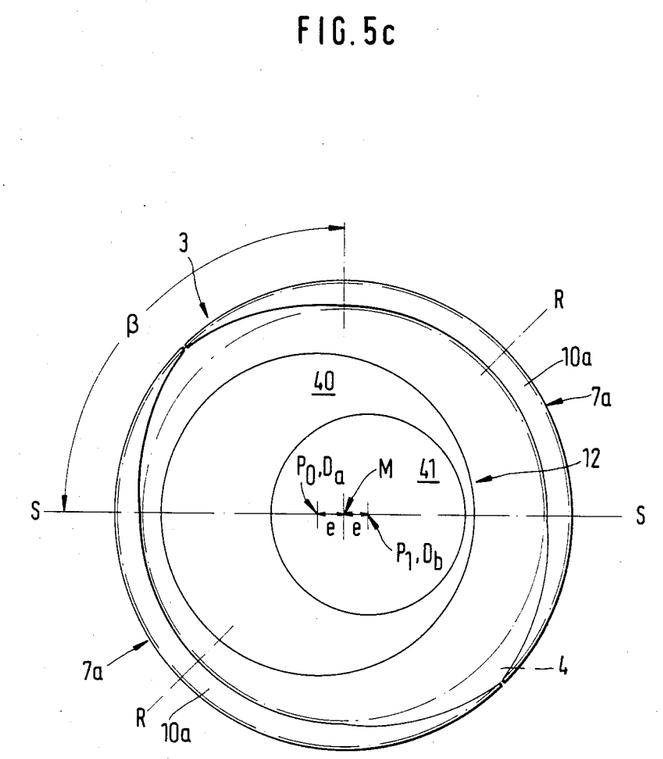

According to the embodiment shown in FIGS. 5a to 5c, the swivel mechanism (12), pivoted with respect to the central axis (M) of the pot in the lower lid (6), has two circular washer sections (40, 41) the mid-point ($P_0$, $P_1$) of which lie diametrically to each other and eccentrically to the central axis (M) of the pot on an axis J-K. Each circular washer section (40, 41) rotatably fits into a corresponding round recess of the associated half-lid (7a, 7b). Therefore, the mid-points ($P_0$, $P_1$) determine the swivel axes ($D_a$, $D_b$) around which the lid-halves (7a, 7b) rotate in their inward and outward motion. The plane of symmetry (S), in which the swivel axes ($D_a$, $D_b$) lie, is offset opposite a vertical central plane (R) by an angle ($\alpha$), in which the segment-shaped flanges (10a, 10b) essentially move together and apart.

FIG. 5a shows the cover unit (3) in the completely open position of the flanges (10a, 10b) immediately after being set atop the lower pot (2). FIG. 5b shows the cover unit (3) after a rotation of the swivel mechanism (12) together with the eccentrically set circular washer sections (40, 41) about an angle ($\alpha$). The flanges (10a, 10b) are displaced slightly laterally against the central plane (R) and also along plane (R) radially toward the inside. This displacement corresponds to the movement defined by the eccentricity (e) of the mid-points ($P_0$, $P_1$). FIG. 5c shows the cover unit (3) after a rotation of the swivel mechanism (12) about an angle ($\beta$). The flanges (10a, 10b) now lie in their closed position which corresponds to the widest interlocking engagement that they exert on the pot rim (4).

We claim:

1. A steam pressure cooker having a pot and a cover unit for pressure sealing said pot by means of a ring-shaped sealing element in which said pot has a circular, smooth pot rim angled toward the outside, which pot rim from a top plan view has a continuous circular outer edge and said cover unit has a lower lid and an upper lid, said upper lid comprising half lids forming a sealing element where in said half lids are movable relative to the lower lid and said pot in a plane parallel to the plane of said pot rim to provide a locking position in which said upper rim section of said half lids are disposed over an outer rim portion of the lower lid and a lower flange of said combination of half lids encirles and engages under the pot rim in locking position wherein the improvement comprises said upper lid consisting of two half-lids in which both half-lids are centrally rotatably hinged relative to the lower lid and the pot about their own swivel axes which are essentially parallel to the central, vertical geometrical axis (M) of the pot, in which said swivel axes lie eccentrically to said central axis (M) of the pot and diametrically opposite each other relative to the central axis (M) and a swivel mechanism hinged in the middle of the lower lid for activating said centrally rotatably hinged half lids.

2. The pressure cooker as described in claim 1, wherein both half-lids are essentially identical, and, in the closed position form a complete upper lid by the interengaging of their edges.

3. The pressure cooker as described in claims 1 or 2 wherein the swivel axes are designed as separate components, which can rotate pivotally in the swivel mechanism, or are designed integrally as part of the swivel mechanism.

4. The pressure cooker as described in claim 2 wherein the interengaging edges of the half-lids at first run radially from one side of their outer perimeter in axial symmetry with regard to the eccentric position of their respective swivel axes at about the height of the swivel axes wherein each of said edges define a concave indentation and a pair of convex tongues associated with the swivel axes after which said edges terminate radially in diametrically opposed sides to the outer perimeter.

5. The pressure cooker as described in claim 4 wherein said concave indentation and said tongues form an interengaging connection upon being placed against each other in the radially-running section of the interengaging edges of the half-lids.

6. The pressure cooker as described in claims 1 or 2 wherein the swivel mechanism contains two circular washer sections disposed eccentrically to said central axis (M) of the pot in which the mid-points ($P_0$, $P_1$) of the washer sections correspond with the positions of the geometrical central axis ($D_a$, $D_b$) of the swivel axes and each circular washer section is pivotally disposed in a corresponding round recess of the associated half-lids.

7. The pressure cooker as described in claim 6 wherein the geometrical central ($D_a$, $D_b$) of the swivel of symmetry axes lie in the same vertical planes both in the fully closed position and in the fully opened position of the half lids.

8. The pressure cooker as described in claim 7 wherein the lower flanges of the half-lids gradually taper in width towards the interengaging edges of the half-lids said taper proceeding from the vertical plane(s) of symmetry containing the geometrical central axis ($D_a$, $D_b$) of the swivel axes.

9. The pressure cooker as described in claim 7 wherein the surface of the inner edges of the lower flanges of the half-lids correspond to the contour of the corresponding area of the outer edge of the pot rim in the opened position of the sealing element.

10. The pressure cooker as described in claim 9 wherein the inner edge of the lower flanges of the half-lids are circular having a radius corresponding to the radius of the circle upon which the outer edge of the pot rim runs.

11. The pressure cooker as described in claims 1 or 2 wherein the swivel mechanism rotatably projects with little play through a central lid opening of the lower lid by means of a screw thread means wherein the swivel mechanism is rotably connected to at the lower lid by means of a counter-nut which is screwed onto a screw thread means.

12. The pressure cooker as described in claim 11 wherein the screw thread means and/or the lid opening have circular cross-sections.

13. The pressure cooker as described in claim 11 wherein the swivel mechanism projects with the screw thread means from the inner side of the lower lid.

14. The pressure cooker as described in claims 1 or 2 wherein the swivel mechanism is supported on the upper face of the lower lid with a widened collar situated between the lower lid and the half-lids.

15. The pressure cooker as described in claim 14 wherein the height of the collar corresponds to the width of the gap between the lower lid and the half-lids.

16. The pressure cooker as described in claim 14 wherein the half-lids are supported by a flat middle section on a flat upper face of the collar.

17. The pressure cooker as described in claims 1 or 2 wherein a lid grip is securely connected to the swivel mechanism disposed above the half-lids.

18. The pressure cooker as described in claims 1 or 2 wherein a guide piece is positioned between the lower lid and the half-lids having two axial-symmetrically placed guide grooves wherein said half-lids each engage said guide grooves by means of a guide pin.

19. The pressure cooker as described in claim 18 wherein the guide grooves are essentially straight and run parallel to each other and to the plane of the pot rim and wherein the guide piece is rotatable about the central axis (M) of the pot.

20. The pressure cooker as described in claim 18 wherein the guide piece surrounds the swivel mechanism in a ring-like manner.

21. The pressure cooker as described in claim 18 wherein the height of the guide piece corresponds essentially with the width of the gap between the lower lid and the half-lids.

22. The pressure cooker as described in claims 1 or 2 wherein the swivel axes are formed as pins received in bore-holes of the swivel mechanism.

23. The pressure cooker as described in claims 1 or 2 wherein at least one of the two swivel axes has a channel defined therein, providing a flow connection between the interior of a pot and a manometer and/or a thermometer provided in the lid grip.

24. The pressure cooker as described in claim 23 wherein the lid grip includes a recess for housing the manometer and/or the thermometer.

25. The pressure cooker as described in claims 1 or 2 wherein the lower lid includes a circumferential gasket groove in the area of the lid seat.

26. The pressure cooker as described in claim 25 wherein the pot has a circumferential groove in the transition zone between the wall and the flanged pot rim providing a corresponding gasket groove on the lower lid.

27. The pressure cooker as described in claims 1 or 2 wherein an air vent and pressure discharge device is provided in the lower lid in which device a vertically movable ventilation weight rises from pressure prevailing in the enclosed interior of the pot through a safety opening in the corresponding half-lids in which the cross-section of the safety opening is just barely larger than the outer cross-section of the ventilation weight.

28. An improved cover for a steam pressure cooker pot comprising:
(a) a lower lid of a circular configuration having a circular shoulder of a circumference greater than the circumference of a downwardly extending rim at its lower end for seating inside the circular opening of said steam pressure cooker pot having a continuous circular outwardly extending rim;
(b) a gasket for disposition between said lower lid and said circular opening of said pressure cooker pot;
(c) a substantially circular upper lid consisting of at least two half lids pivotally mounted at one end with respect to said lower lid and terminating at the other end in a flange wherein said combination of flanges of said half-lids substantially engage the entire circumference of said continuous outwardly extending rim of said pressure cooker and said half-lids and said flanges are radially slideable relative to said lower lid and said continuous circular outwardly extending rim of said pressure cooker pot; and
(d) a swivel mechanism rotatably mounted relative to said lower lid for actuating said half-lids.

29. The improved cover for a steam pressure cooker of claim 28 wherein a guide is disposed between said swivel mechanism and said lower lid.

30. The improved cover for a steam pressure cooker of claim 28 or 29 wherein said swivel mechanism, is circular and said guide piece is circumscribed by said circular swivel mechanism.

31. The improved cover for a steam pressure cooker of claim 28 or 29 wherein said pivotal mounting of said half-lids are a pin and bore-hole combination disposed in said swivel mechanism.

32. The improved cover for a steam pressure cooker of claim 31 wherein at least one of said pin and bore-hole combinations is a channel axis for providing a flow connection between said pot and a manometer and/or thermometer disposed in a lid grip.

33. The improved cover for a steam pressure cooker of claim 28 or 29 further comprising an air vent and pressure discharge opening disposed in said lower lid.

34. The improved cover for a steam pressure cooker of claim 33 further comprising a combination of a moveable ventilation weight and safety opening combination wherein said ventilation weight is activated into said pressure discharge opening by pressure in said pot to prevent the opening of said half-lids above a predetermined pressure.

35. A steam pressure cooker having a pot and a cover unit for pressure sealing said pot by means of a ring-shaped sealing element in which said pot has a circular, smooth pot rim angled toward the outside, which pot rim from a top plan view has a continuous circular outer edge and said cover unit has a lower lid and an upper lid, said upper comprising half lids forming a sealing element that is movable relative to the lower lid and said pot in a plane parallel to the plane of said pot rim to provide a locking position in which an upper rim section of the half lids of said upper lid is disposed over an outer rim portion of the lower lid and a lower flange of each half lid of said upper lid is extending through about half of the perimeter and engaging under the pot rim in locking position wherein the improvement comprises said half-lids being centrally rotatably hinged relative to the lower lid and the pot about their own swivel axes which are essentially parallel to the central, vertical geometrical axis (M) of the pot, in which said swivel axes lie eccentrically to said central axis (M) of the pot and diametrically opposite each other relative to the central axis (M) and a swivel mechanism hinged in the middle of the lower lid for activating said centrally rotatably hinged half lids in which said swivel mechanism contains two circular washer sections disposed eccentrically to said central axis (M) of the pot in which the mid-points ($P_0$, $P_1$) of the washer sections correspond with the positions of a corresponding geometrical central axis ($D_a$, $D_b$) of the swivel axes and each circular washer section is disposed in a corresponding round recess of the associated half-lids.

* * * * *